United States Patent
Hwang

(10) Patent No.: US 10,750,544 B2
(45) Date of Patent: Aug. 18, 2020

(54) ANALYSIS METHOD FOR MULTI-USER RANDOM ACCESS SIGNALS

(71) Applicant: YUAN ZE UNIVERSITY, Zhongli Dist. (TW)

(72) Inventor: Jeng-Kuang Hwang, Zhongli (TW)

(73) Assignee: Yuan Ze University, Taoyuan (TW)

( * ) Notice: Subject to any disclaimer, the term of this patent is extended or adjusted under 35 U.S.C. 154(b) by 0 days.

(21) Appl. No.: 16/227,200

(22) Filed: Dec. 20, 2018

(65) Prior Publication Data
US 2019/0357258 A1  Nov. 21, 2019

(30) Foreign Application Priority Data
May 16, 2018   (TW) .............................. 107116680 A

(51) Int. Cl.
*H04W 74/08* (2009.01)
*H04W 56/00* (2009.01)
*H04L 29/08* (2006.01)
*H04L 25/02* (2006.01)
*H04L 27/26* (2006.01)
*H04L 5/00* (2006.01)
*H04B 1/7136* (2011.01)
*H04J 11/00* (2006.01)

(52) U.S. Cl.
CPC ....... *H04W 74/0833* (2013.01); *H04W 56/00* (2013.01); *H04B 1/7136* (2013.01); *H04B 2001/71367* (2013.01); *H04B 2201/71353* (2013.01); *H04J 11/0023* (2013.01); *H04L 5/0007* (2013.01); *H04L 25/0204* (2013.01); *H04L 27/2659* (2013.01); *H04L 67/12* (2013.01)

(58) Field of Classification Search
CPC .............. H04W 74/0833; H04W 56/00; H04L 25/0204; H04L 27/2659; H04L 5/0007; H04L 67/12; H04B 2201/71353; H04B 1/7136; H04B 2001/71367; H04J 11/0023
See application file for complete search history.

(56) References Cited

U.S. PATENT DOCUMENTS 10,148,461 B2 * 12/2018 Lin ...................... H04J 11/0023
2005/0259621 A1   11/2005 Lee
(Continued)

OTHER PUBLICATIONS

Jeng-Kuang Hwang, Cheng-Feng Li, Chingwo Ma; Efficient Detection and Synchronization of Superimposed NB-IoT NPRACH Preambles; IEEE Internet of Things Journal; 2327-4662 (2018). DOI 10.1109/JIOT.2018.2867876.

*Primary Examiner* — Brian T O Connor
(74) *Attorney, Agent, or Firm* — Rosenberg, Klein & Lee

(57) ABSTRACT

An analysis method for multi-user random access signals is disclosed, which solves the connection problem between a base station and a user equipment when the narrow-band IoT uplink signal transmission is implemented. The analysis method of the present invention utilizes the detection threshold value to effectively determine multiple user equipment to be signaled; then, for each detected user equipment, an effective method based on the phase difference is used to estimate their synchronization parameters, i.e. time-of-arrival (ToA) and residual carrier frequency offset (RCFO). Therefore, according to the present invention, random access signals can be received correctly and efficiently and the user equipment related information can be obtained at the same time to facilitate subsequent communications.

4 Claims, 6 Drawing Sheets

(56) References Cited

U.S. PATENT DOCUMENTS

2017/0324587 A1 11/2017 Lin et al.
2019/0036757 A1* 1/2019 Kilian .................. H04L 27/2691
2019/0141751 A1* 5/2019 Lin ...................... H04B 1/7143

* cited by examiner

ANALYSIS METHOD FOR MULTI-USER RANDOM ACCESS SIGNALS

This application claims priority for Taiwan patent application no. 107116680 filed on May 16, 2018, the content of which is incorporated by reference in its entirely.

BACKGROUND OF THE INVENTION

Field of the Invention

The present invention relates to an analysis method for random access signals, particularly to an analysis method for random access signals of multiple user equipment in an NB-IoT uplink system.

Description of the Related Art

In the NB-IoT standard of the 3G Partnership Project (3GPP), a brand new channel, i.e. the Narrowband Physical Random Access Channel (NPRACH), is defined in the uplink signals of user equipment to increase the transmission distance between user equipment and base stations. The NPRACH adopts a preamble signal in the format of single-tone frequency hopping (STFH). The preamble signal is the first signal user equipment transmits to a base station, also called Message-1, expressing that the user equipment intends to link with the base station. Therefore, it is an important problem for the base station side: how to correctly and effectively receive the NPRACH preamble signal and simultaneously acquire the related information of the user equipment to facilitate subsequent communication.

In the NPRACH structure, a preamble signal is normally composed of 4 symbol groups. While the preamble signal is used as the unit of channel hopping, each symbol group is composed of 5 symbols and a cyclic prefix. While there is a plurality of user equipment, the NB-IoT system having a bandwidth of 180 kHz can support the wireless access of at most 48 user equipment and the transmissions of the NPRACH preamble signals thereof to the base station. The kth user equipment ($UE_k$) is defined to carry an $n_{init}(k)$ parameter, wherein k ranges from 0 to 47. Thereby, the channel hopping can be undertaken according to the preamble signals generated by the single-tone symbol groups. Thus, the NPRACH of the ith symbol of the nth symbol group of $UE_k$ is a single-tone signal, and the subcarrier frequency thereof is $f_k(n) \times \Delta f(n)$, wherein $f_k(n) \in [0,47]$, expressing the index of the channel hopping carrier of the nth symbol group of the kth user equipment.

FIG. 1 shows 48 possible channel hopping groups generated according to the 3 GPP R13 NPRACH standard, wherein $\{f_k(n), k=0\sim47, n=0\sim31\}$. As shown in FIG. 1, anyone of the channel hopping groups would not collide with another of the channel hopping groups. In other words, each of the hopping groups is different from the others of the hopping groups. In the single-tone fundamental frequency vector signal, which is transmitted by $UE_k$ and has a length of L×1, the ith symbol of the nth symbol group may be expressed by $$s_{k,n,i}(l) = \exp(j2\pi f_k(n)l/L) \quad (1)$$

The time-domain vector signal of the nth symbol group may be expressed by $$g_{k,n} = CP\{REP_5(s_{k,n,i})\} \quad (2)$$

wherein $REP_r(a)$ expresses the repeated concatenation of the same column vector a for r times; CP {●} expresses the operation mode of CP, resulting in the length of $5L+L_{cp}$. Four symbol groups constitute a preamble signal, and the NPRACH signal may consist of a number of preamble signals. Similar to the conventional LTE uplink system, the whole NPRACH fundamental frequency signal has an additional $\Delta f/2$ frequency shift, which is converted by up-conversion to the central frequency that can be transmitted.

In the signal-receiving mode of a base station eNodeB (eNB) involving a plurality of user equipment, as different user equipment (UEs) may have different distances to the base station eNB, there are different delays for the NPRACH signals transmitted therebetween and different time-of-arrivals (ToAs). $D_k \in [0, L_{cp}-1]$. The channel between each user equipment and the base station eNB can be expressed by a single-tap flat Rayleigh fading channel. Because the channel varies very slowly, the signal fading of $UE_k$ can be simplified to be a complex fading coefficient $h_k \sim CN(0,\sigma_k^2)$, wherein $\sigma_k^2$ expresses the average received signal power of $UE_k$ at the eNB. Each user equipment also has a residual carrier frequency offset (RCFO) parameter $\eta_k$, which has only a very small value. The signal received by eNB is formed by superimposing the fading NPRACH preamble signals of multiple user equipment and has AWGN (Additive White Gaussian Noise) with an power of $\sigma_n^2$. Therefore, the input time-domain signal-to-noise power ratio SNR for $UE_k$ can be expressed by $$SNR_i(k) = \sigma_k^2/\sigma_n^2 \quad (2)$$

At eNB, the received RF signal is first down converted and frequency shifted by $-\Delta f/2$. Then, the baseband receiver performs the CP removal and taking 512-point FFT for each symbol in the symbol groups according to the timing of eNB. As the residual carrier frequency offset (RCFO) is quite small in practice, the inter-carrier interference (ICI) and the multiple access interference (MAI) can be neglected. After some derivation, it can be shown that the post-FFT signal vector of the ith symbol of the nth symbol group has its $f_k(n)^{-th}$ FFT bin as follow:

$$R(n, i, f_k(n)) = L|h_k|S_L(\eta_k) \times \begin{bmatrix} e^{-j2\pi D_k f_k(n)/L} \times e^{j2\pi \eta_k t(n,i)/L} \times \\ e^{j(\theta_k+\phi_k+\varphi_k)} \times B(\eta_k \leq 0)e^{-j\pi} \end{bmatrix} + W(n, i) \quad (4)$$

$$= L|h_k|S_L(\eta_k)e^{j\beta_{k,n,i}} + W(n, i)$$

wherein $$S_L(\eta) = \frac{\sin(\pi\eta)}{L\sin(\pi\eta/L)};$$

$t(n,i)=n(5L+L_{cp})+iL$; $\phi_k=-\pi\eta_k(L-1)/L$; $\varphi_k=\angle h_k$ is the channel phase coefficient; $\theta_k \sim U(0,2\pi)$ is the carrier phase offset; if $\eta_k \leq 0$, $B(\eta_k \leq 0)=1$; alternatively, $b(\eta_k \leq 0)=0$; $\beta_{k,n,i}=2\pi(\eta_k t(n,i)-D_k f_k(n))/L + \theta_k + \phi_k \times \varphi_k - B(\eta_k \leq 0)\pi$; $W(n,i)$ is the post-FFT AWGN noise samples with power $L \times \sigma_n^2$.

In the case that $UE_k$ is absent, $R(n,i,\phi_k(n))=W(n,i)$ and is expressed by $CN(0,L\sigma_n^2)$. In the case that $UE_k$ exists, the residual carrier frequency offset is very small ($S_L(\eta_k) \approx 1$). Thus is obtained Equation (5):

$$R(n,i,\phi_k(n)) = L|h_k|e^{j\beta_{k,n,i}} + W(n,i) \quad (5)$$

which may be expressed by $CN(0, L^2\sigma_k^2+L\sigma_n^2)$. The absolute value $L|h_k|$ of the signal component is not fluctuating over the symbols. Thus, the post-FFT SNR of $UE_k$ becomes $SNR_o=(L^2\sigma_k^2)/(L\sigma_n^2)=L\times SNR_i$, which is L times of $SNR_i$. Therefore, the single-tone signal can be coherently summed up.

Based on the above discussion, the problems of detection and estimation in the multi-UE NPRACH are summarized as follows: in order to catch the presence and identity the parameter $\{n_{init}(k)\}$ of the UEs, the performance of detection should achieve an false alarm probability $P_F\leq 0.1\%$ and a detection probability $P_D>99\%$; it is also very important for detecting all user equipment to precisely and efficiently estimate ToA and RCFO.

In 2016, Lin et al. proposed a paper "Random Access Preamble Design and Detection for 3GPP Narrowband IoT systems" published in IEEE Wireless Communications Letters, vol. 5, no. 6, pp. 640-643, December 2016, which is to integrally deal with the problems of detection and estimation in NPRACH, and intends to use the peak values of 2D-FFT to detect the existence of user equipment and estimate ToA/RCFO. However, the conventional technology involves several problems: it is hard to perform the critical 2D-FFT of the matrix of the fundamental frequency data; the practical computation is much more complicated than the proposed method; the paper does not described the detection threshold and performance analysis in detail.

Accordingly, the present invention proposes an analysis method for multi-user random access signals to solve the problems of the conventional technologies.

SUMMARY OF THE INVENTION

The primary objective of the present invention is to provide an analysis method for multi-user random access signals, which is to solve the linking problems of user equipment and base stations while an NB-IoT uplink signal is transmitted, including the problem of detecting signal accessing and the problem of estimating the time synchronization parameter and the frequency synchronization parameter, whereby can be achieved an overall detection performance with an false alarm probability $P_F\leq 0.1\%$ and a detection probability $P_D>99\%$, and whereby all user equipment can be efficiently detected, and whereby ToA and RCFO can be precisely estimated, wherefore the present invention can achieve better performance with less computation.

Another objective of the present invention is to provide a low-complexity analysis method for multi-user random access signals, which has advantages of higher precision, less computation and definite threshold values.

In order to achieve the abovementioned objectives, the present invention proposes an analysis method for multi-user random access signals, which applies to an NB-IoT uplink system, and which comprises steps: receiving the preamble signals of the random access signals from a plurality of user equipment, detecting a plurality of symbol groups of each preamble signal and acquiring the corresponding average power, and comparing each average power with a detection threshold value to determine whether the user equipment intends to access the base station; after determining the user equipment intending to access the base station, acquiring the phase trace of the preamble signal of each detected user equipment, and calculating parameters of ToA and RCFO according to the phase difference of adjacent symbol groups of the phase trace.

While the average power is greater than the detection threshold value, it means that the corresponding user equipment intends to access the base station. While the average power is lower than the detection threshold value, it means that the corresponding user equipment does not intend to access the base station.

In the present invention, the abovementioned detection threshold value is a Neyman Pearson threshold value. The detection threshold value is determined using a false alarm level and a decision delay of the random access signal in cooperation with a detected noise power. The decision delay is the number of all the symbol groups of the random access signal. For example, each preamble signal has four symbol groups; the number of the preamble signal multiplied by four is the number of all the symbol groups.

Below, embodiments will be described in detail in cooperation with the attached drawings to make easily understood the objectives, technical contents and accomplishments of the present invention.

DETAILED DESCRIPTION OF THE INVENTION

Figure 1:
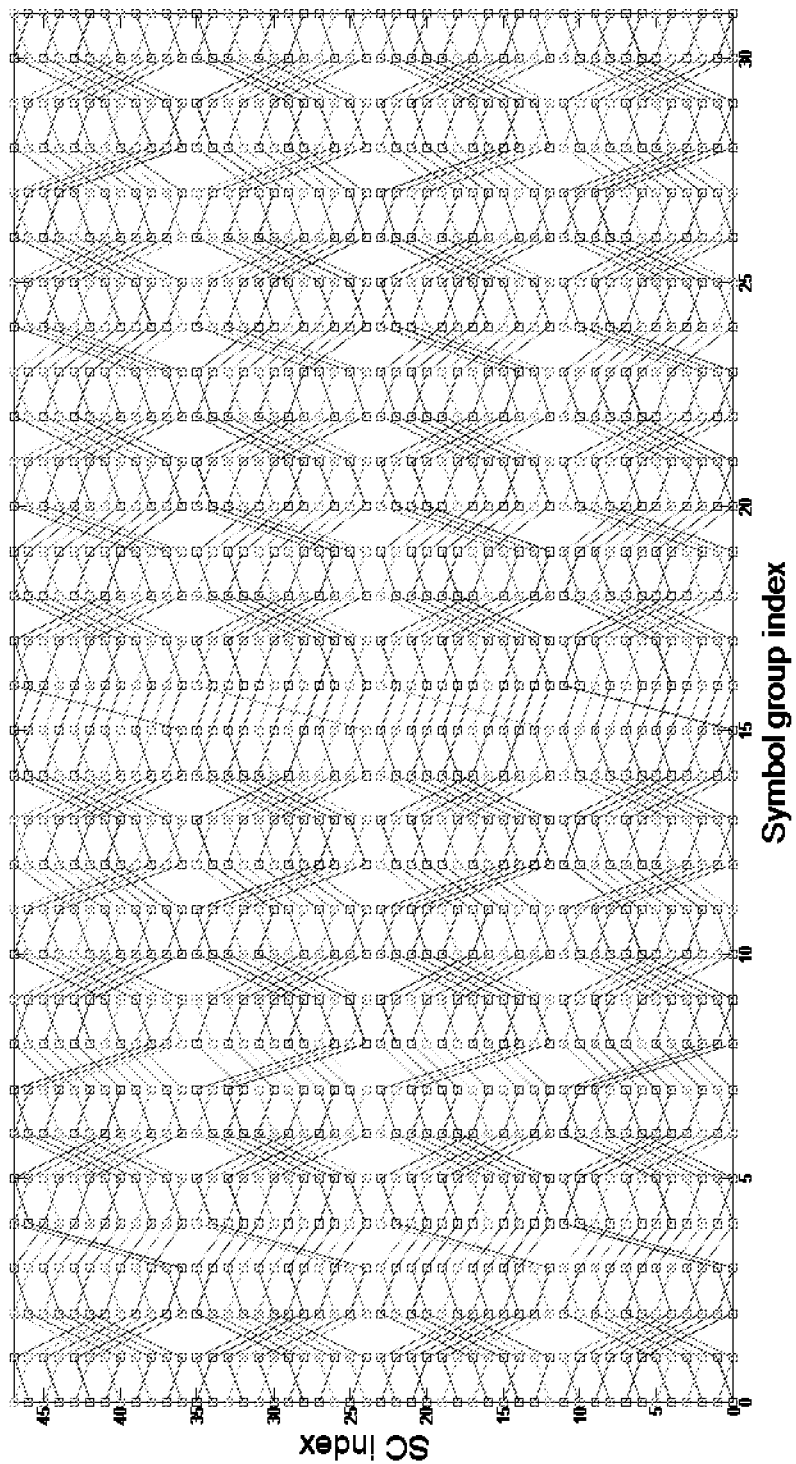
FIG. 1 is a diagram schematically showing 48 possible channel hopping groups generated according to the 3GPP R13 NPRACH standard.
Figure 2:
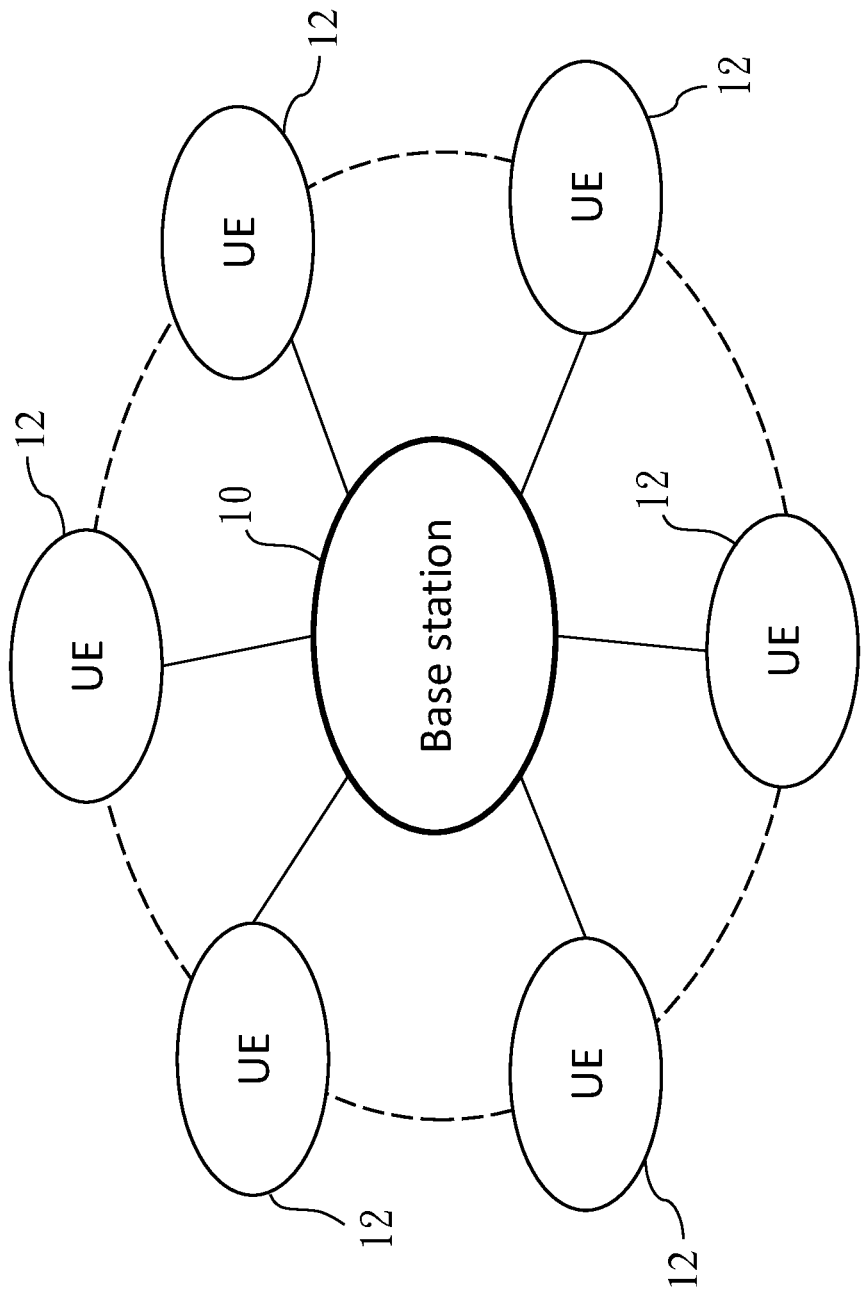
FIG. 2 is a diagram schematically showing a multi-user system applied to NB-IoT according to one embodiment of the present invention.

Refer to FIG. 2, in the random access process of the NB-IoT uplink system, the first piece of uplink signal of the user equipment 12 is called NPRACH, which uses a single-tone frequency hopping preamble sequence. The time unit of frequency hopping is a symbol group. According to the cellular coverage and the distance between the base station and the user equipment, a base station (eNB) 10 specifies the length of the preamble sequence, which is to be sent out by the user equipment 12, in the information block of the downlink system thereof. A detection threshold value is set in the NPRACH receiver algorithm to achieve the false alarm probability and the detection probability, which are regulated by the NB-IoT standard, and to estimate the parameters of ToA and RCFO.

Figure 3:
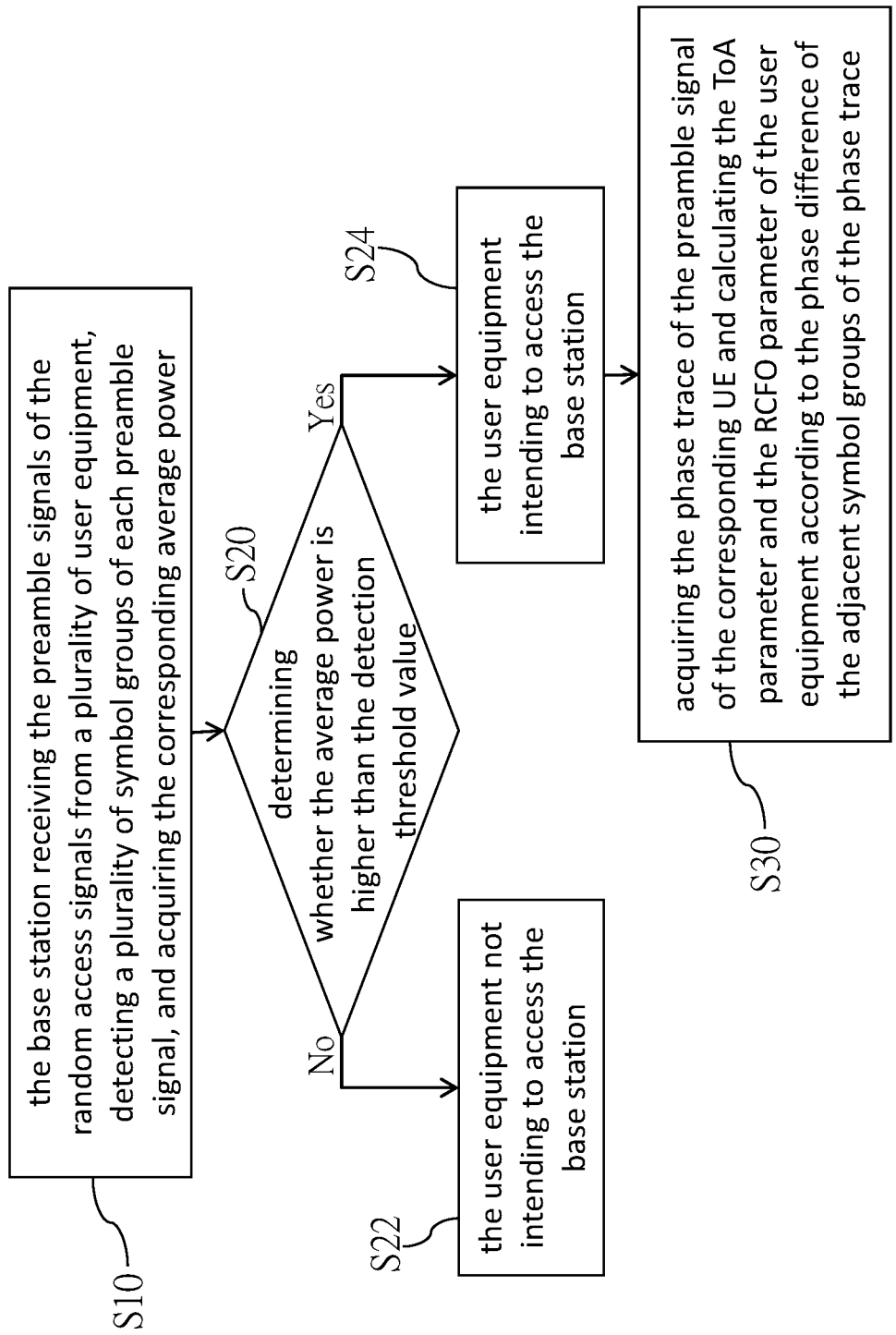
FIG. 3 is a flowchart of an analysis method according to one embodiment of the present invention.

The present invention proposes an analysis method for multi-user random access signals, which is extensively applicable to the NB-IoT uplink system. Refer to FIG. 2 and FIG. 3, the analysis method of the present invention comprises Steps 10-30. In Step S10, the base station 10 receives the preamble signals of the random access signals from a plurality of user equipment 12, detects a plurality of symbol groups of each preamble signal, and acquires the corresponding average energies. In other words, the base station 10 collects the bits generated by the post-FFT of all the symbol groups and detects the sufficient statistics of the user equipment to determine the average power.

In Step S20, determine whether there is any user equipment 12 intending to access the base station 10 according to the corresponding average power and a detection threshold value. In Step S22, the average power is lower than the threshold value, and the corresponding user equipment 12 does not intend to access the base station 10; then, the process would not proceed to the next step but ends herein. In Step S24, the average power is higher than the threshold value, and the corresponding user equipment 12 intends to access the base station 10; then the process proceeds to Step S30. The abovementioned detection threshold value is a Neyman Pearson threshold value. The Neyman Pearson threshold value is determined using a false alarm level and a decision delay, which are obtained beforehand from the random access signal, in cooperation with a detected noise power. The decision delay is the number of all the symbol groups of the random access signal.

In Step S30, while having detected the user equipment 12 intending to access the base station 10, the base station 10 acquires the phase trace of the preamble signal of the corresponding user equipment 12 and calculates the ToA parameter and the RCFO parameter of the user equipment 12 according to the phase difference of the adjacent symbol groups of the phase trace. In Step S30, it is according to the phase trace that the ToA parameters and the RCFO parameters are sequentially estimated. In other words, the phase difference induced by channel hopping of the symbol groups is calculated firstly, and all phase differences corresponding to all preamble signals are averaged, whereby to acquire the RCFO parameter corresponding to the user equipment; next, the average phase of each symbol group is calculated to acquire the average phase difference corresponding to each symbol group; the average phase differences are summed up to obtain the related ToA parameter.

After the technical characteristics of the present invention have been described above, the principles of the present invention will be described thereinafter to prove that the analysis method for multi-user random access signals is practicable and easy to practice.

As there are 48 distinct and possible hopping groups, the test data $Q_k$ of each user equipment is used to compensate for the bits of the corresponding post-FFT. The test data $Q_k$ of $UE_k$ is defined as $$Q_k = \{R(n,i,f_k(n)), n=0, \ldots, N-1, i=0,1, \ldots 4\}$$

wherein N=4P and means the number of all the symbol groups; P is the number of the preamble signals for detection; N is also regarded as the decision delay in the user equipment detection process. For different coverage class, the base station eNB may designate P to be 1, 2, 4, 8, 16, 32, 64, and 128, which are respectively corresponding to the decision delays N of 4, 8, 16, 32, 64, 128, 256, and 512. Therefore, if the user equipment $UE_k$ has a lower receiving SNR, it is necessary to collect more data, i.e. obtain larger N, leading to a longer decision delay for the farther or weaker user equipment.

As the hopping groups are orthogonal to each other, the superimposed NPRACH detection problems can be decoupled into a parallel of single-UE detection problem. In order to test the presence of $UE_k$, the energy of the bits of the post-FFT of N symbol groups is collected; then, the sufficient statistics of detecting the user equipment is used to determine the average power:

$$P_k(N) = \frac{1}{5N} \sum_{n=0}^{N-1} \sum_{i=0}^{4} |R(n, i, f_k(n))|^2 \qquad (7)$$

Next, the decision rule used to determine the presence of $UE_k$ can be simplified comparing $P_k(N)$ with a threshold value $\lambda$, which may be expressed by $$P_k(N) \underset{UE_k\ absent}{\overset{UE_k\ present}{\gtreqless}} \lambda \qquad (8)$$

The receiver operation characteristic (ROC) or the performance test can be expressed by the false alarm probability $P_F$ $$P_D = Pr(P_k(N) > \lambda / UE_k \text{ is present}) \qquad (9)$$

The detection probability $P_D$ is expressed by $$P_D = Pr(P_k(N) > \lambda / UE_k \text{ is present}) \qquad (10)$$

Therefore, the main problem of NPRACH detection is to specify the threshold value $\lambda$. The NB-IoT standard demands that the detection probability $P_D$ must exceed 99% and the false alarm probability $P_F$ should not exceed 0.1%. In order to achieve the two conditions, the present invention uses the Neyman Pearson rule to resolve the detection problem, which is expressed by $$\max\{P_D\}, \text{ such that } P_F \leq \alpha \qquad (11)$$

It means that the decision rule is most powerful at the significant level $\alpha$ for the threshold value $\lambda$. In the case of NB-IoT, it may be selected that $\alpha$=0.1%. According to the Neyman Pearson rule, the threshold value $\lambda$ is the function of the decision delay N and has two parameters of a specified false alarm level $\alpha$ and a noise power $P_n = L\sigma_n^2$. Suppose that the receiver can detect the noise power $P_n$. Thus, the threshold value $\lambda$ must satisfy the equation:

$$\int_\lambda^\infty g_n(x)dx = \alpha \qquad (12)$$

wherein $g_n(x)$ is a probability density function (PDF) of test statistics $P_k(N)$ under the noise-only case. Since $P_k(N)$ is the average power of 10×N independent real Gaussian random variables (RVs) with identical distribution $N(0, P_n/2)$. Therefore, PDF $g_n(x)$ is determined by a scaled central Chi-square distribution with 10×N degrees of freedom as follows:

$$g_n(x) = \kappa f_c(\kappa x; 10N) \qquad (13)$$

wherein $$f_c(x; m) = \frac{1}{2^{k/2}\Gamma(k/2)} x^{\frac{k}{2}-1} e^{-\frac{x}{2}} u(x) \qquad (14)$$

which is a standard $\chi_m^2$ PDF with in degrees of freedom, wherein $\kappa = (10N)/(L\sigma_n^2) = 10N/P_n$ is a scale factor. The cumulative distribution function (CDF) of the standard $\chi_m^2$ PDF is determined by $$F_c(x; m) = \int_0^x f_c(\lambda; m)d\lambda = \frac{1}{\Gamma\left(\frac{k}{2}\right)} \gamma\left(\frac{k}{2}, \frac{x}{2}\right) u(x) \qquad (15)$$

wherein $\gamma(s,t) = \int_0^x t^{s-1} e^{-t} dt$ is a lower incomplete Gamma function.

It is learned from Equation (11): the false alarm level $\alpha$ and the decision delay N can be used to definitely determine the optimized Neyman Pearson threshold value $\lambda_o$ with the equation:

$$\lambda_o = \frac{1}{\kappa} F_c^{-1}(1-\alpha; 10N) \quad (16)$$

$$= P_n \times \left(\frac{1}{10N} F_c^{-1}(1-\alpha; 10N)\right)$$

$$= P_n \times A(N;\alpha)$$

wherein $F_x^{-1}(x; m)$ is the inverse function of $\chi_m^2$ CDF, i.e. $F_c^{-1}(F_c(x; m); m)=x$.

Figure 4:
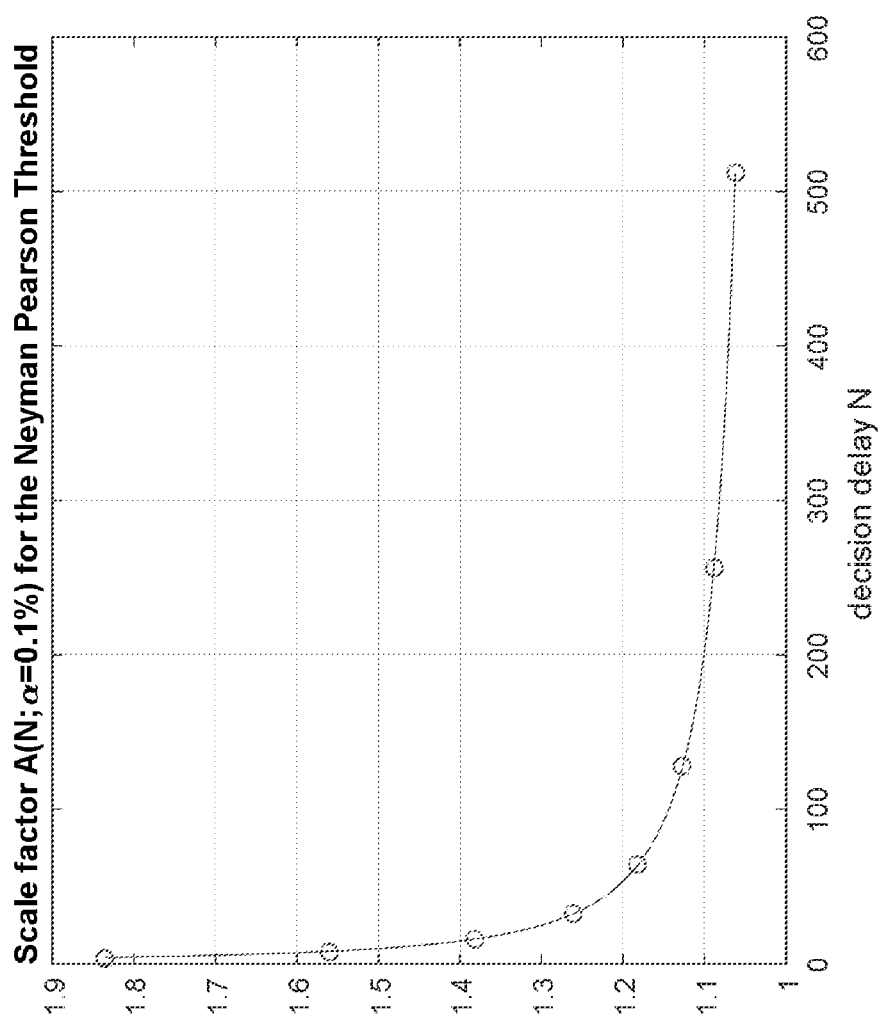
FIG. 4 is a diagram showing the relationship between the scale factor A(N; $\alpha$=0.1%) and the decision delay N.

From Equation (16), it is noted to determine the threshold for a given $\alpha$ and N. The average noise power $P_n$ of post-FFT can be precisely measured using those noise-only resource grids. The threshold value is obtained via multiplying $P_n$ by the scale factor $A(N; \alpha)$. FIG. 4 shows the relationship of the scale factor $A(N; \alpha)$ and the decision delay N. The scale factor is always greater than one, but it decreases with the increase of N.

The 48 average energies of the channel hopping mode along different user equipment can be worked out using only 48 values of 512-point FFT. The scale factor $A(N; \alpha=0.1\%)$ can be calculated beforehand and picked up from the memory for application. Therefore, the present invention can realize NPRACH detection in very low complexity and very low power consumption.

Next is deduced the detection performance in the AWGN channel and the Rayleigh fading channel. For the AWGN channel, suppose that the composite fading coefficient $h_k=1$ and that $R(n,i,\phi_k(n))$ has a non-zero average value $Le^{j\beta_{k,n,i}}$. In the AWGN channel, the signal power of post-FFT is $P_0=L^2$, which is nonrandom. With the signal and noise, a scaled non-central Chi-square distribution PDF may be used to express the statistical data $P_k(N)$ as follows:

$$g_s(x) = \kappa f_{nc}(\kappa x; 10N, \gamma_0) \quad (17)$$

wherein k is the same as the scale factor in Equation (13).

$$f_{nc}(x; m, \gamma_0) = \frac{1}{2} e^{-(x+\gamma)/2} \left(\frac{x}{\gamma_0}\right)^{k/4-1/2} I_{k/2-1}(\sqrt{\gamma_0 x}) u(x) \quad (18)$$

Equation (18) is a standard non-central Chi-square distribution PDF with m degrees of freedom, wherein the non-central parameter c is given by the following equation:

$$\gamma_0 = 10N \times P_0/P_n = 10NL/\sigma_n^2 \quad (19)$$

$I_v(x)$ is the modified Bessel function of the first kind with degree v. CDF of $f_{nc}(x; m, \gamma_0)$ is expressed by $$F_{nc}(x; m) = \int_0^x f_{nc}(\lambda; m, \gamma_0) d\lambda = 1 - Q_{\frac{k}{2}}(\sqrt{\gamma_0}, \sqrt{x}) \quad (20)$$

wherein $$Q_M(a,b) = \int_b^\infty x \left(\frac{x}{a}\right)^{M-1} \exp\left(-\frac{x^2+a^2}{2}\right) I_{M-1}(ax) dx \quad (21)$$

Equation (21) is a generalized Marcum Q-function; a and b are the parameters substituted into the equation for computation.

After the Neyman Pearson threshold value $\lambda_0$ is acquired, the theoretical detection probability $P_D$ under the AWGN channel may be derived as $$P_{D,AWGN}(\gamma_0) = Q_{5N}(\sqrt{\gamma_0}, \sqrt{10N \times \lambda_o/P_n}) \quad (22)$$

$P_{D,AWGN}(\gamma_0)$ may be used to calculate the detection probability under the Rayleigh fading channel Letting $\sigma_k^2=1$ without loss of generality, then $\rho=|h_k|^2$ is an exponential redundancy version (RV) with unity mean. The average signal power of post-FFT $P_s=E[\rho P_0]=P_0$ is unchanged and the non-central parameter becomes $\gamma=\rho\gamma_0$. Therefore, the detection probability under the Rayleigh fading channel may be obtained by averaging $P_{D,AWGN}(\gamma_0)$ over the PDF of $\rho$ and may be expressed by the following implicit integral expression:

$$P_{D,Fading}(\gamma_0) = \int_0^\infty e^{-\rho} Q_{5N}(\sqrt{\rho\gamma_0}, \sqrt{10N \times \lambda_o/P_n}) d\rho \quad (23)$$

Equation (23) may have a complicated closed-form formula. However, the present invention can use numerical integration to calculate the theoretical detection performance under the Rayleigh fading channel.

Figure 5:
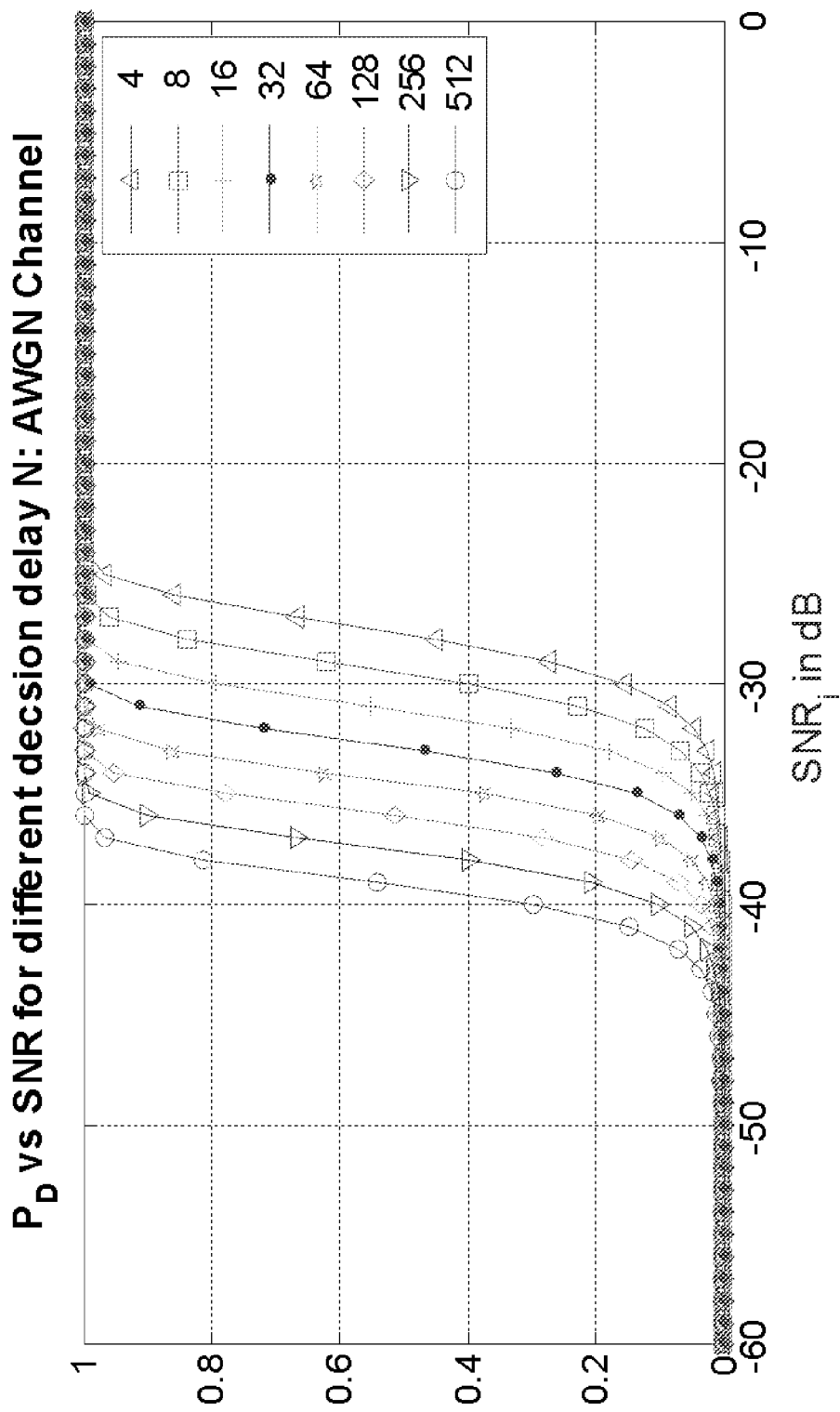
FIG. 5 is a diagram showing theoretical curves of the relationship of $P_{D,AWGN}$ to $SNR_i$ for different decision delays at $\alpha$=0.1% according to one embodiment of the present invention.
Figure 6:
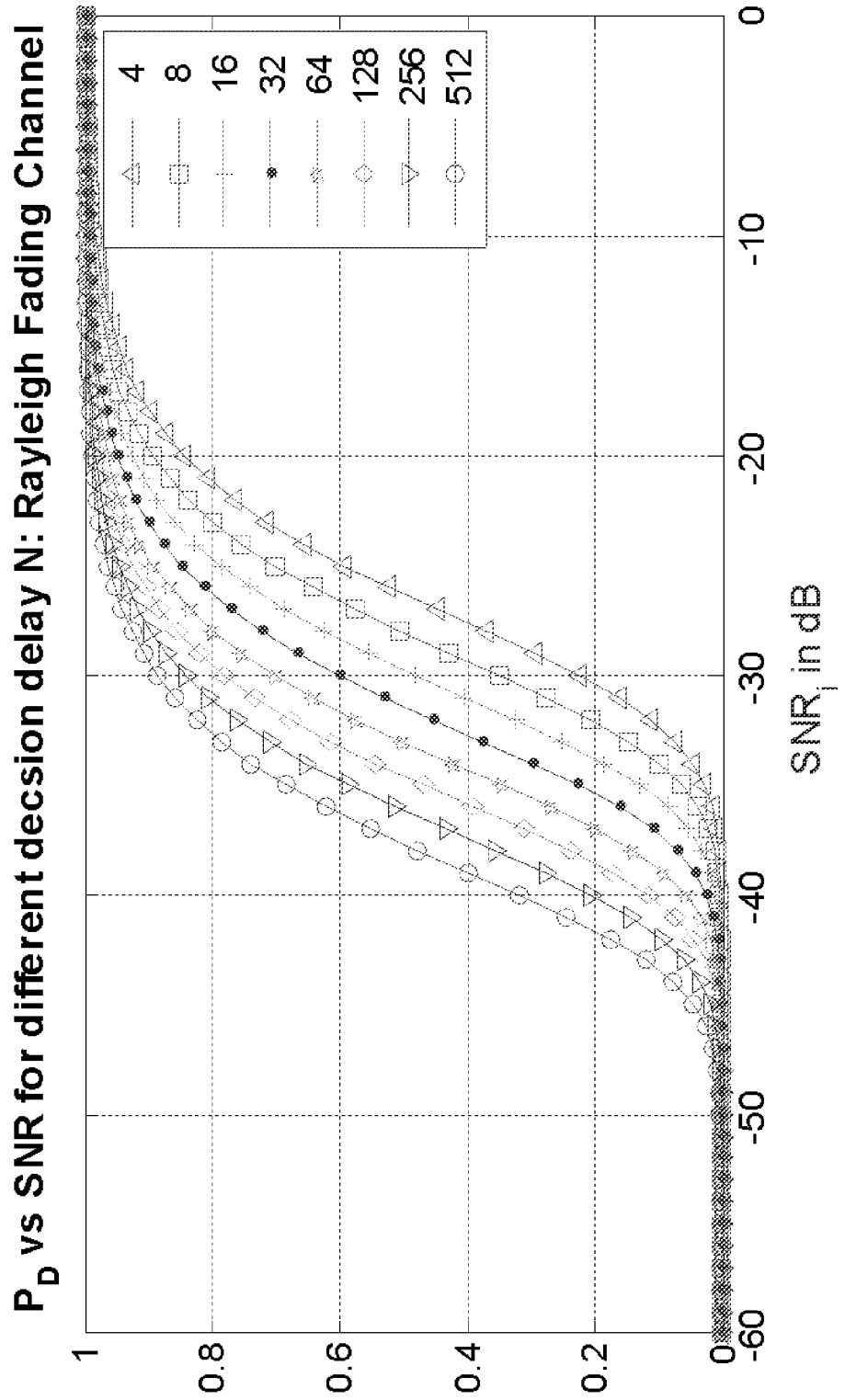
FIG. 6 is a diagram showing theoretical curves of the relationship of $P_{D,Fading}$ to $SNR_i$ for different decision delays at $\alpha$=0.1% according to one embodiment of the present invention.

Refer to FIG. 5 and FIG. 6 respectively showing the theoretical curves of the relationships of $P_{D,AWGN}$ and $P_{D,Fading}$ to $SNR_i$ for different decision delays at $\alpha=0.1\%$. In order to verify the analyses, the performance curves is simulated with the Monte-Carlo method. The results show that the simulation curves almost coincide with the theoretical curves. It is observed in these curves: a longer preamble signal, i.e. a larger N, can significantly improve the UE detection performance of eNB, especially while SNR is low. In other words, eNB can use a longer NPRACH configuration to extend the coverage thereof.

After NPRACH detection has been discussed above, the present invention proposes an algorithm that can effectively estimate the synchronization parameters of ToA and RCFO. The algorithm integrates the abovementioned detection methods, addressing only the detected user equipment and using the decoupling method described below to estimate the parameters of ToA and RCFO.

For the detected user equipment $UE_k$, the algorithm starts from its unwrapped phase trace of $R(n,i, f_k(n))$ expressed as:

$$q_{k,n,i} = \text{unwrap}\{\arg\{R(n,i,f_k(n))\}\} \quad (24)$$

In the noise-free case, the phase trace can be obtained using $q_{k,n,i} = \beta_{k,n,i} - 2\pi D_k f_k(n) - 2\pi \eta_k(n,i) + C$ in Equation (4), wherein C is a constant phase. As the first two phase terms are directly related to RCFO and ToA parameters, the phase trace, together with suitable phase differences, can be used to estimate the two synchronization parameters. Further, average operation can be used to decrease the estimation variance caused by AWGN.

For each symbol group of 5 symbols, there are four adjacent phase differences that can be calculated:

$$\varepsilon_{k,n,i} = q_{k,n,i+1} - q_{k,n,i} \text{ for } i=1,2,3,4, \quad (25)$$

Next, by averaging $\varepsilon_{k,n,i}$ over all n and i in the preamble, it can obtain the RCFO estimate for $UE_k$, as shown by the equation:

$$\hat{\eta}_k = \frac{1}{2\pi} \times \frac{1}{4N} \sum_{n=0}^{N-1} \sum_{i=1}^{4} \varepsilon_{k,n,i} \quad (26)$$

Next, in order to estimate ToA parameter, the derivative terms of RCFO is removed from $q_{k,n,i}$ to obtain Equation (27):

$$\bar{q}_{k,n,i} = q_{k,n,i} - 2\pi \hat{\eta}_k \Delta f t_{n,i} \quad (27)$$

wherein $t_{n,i}=[(5n+i)L+(n+1)L_{cp}]T_s$ is the starting time instant of the ith symbol of the nth symbol group. The average phase of each symbol group $\bar{q}_{k,n,i}$ may be expressed by $$z_{k,n} = \frac{1}{5}\sum_{i=0}^{4} \bar{q}_{k,n,i} \qquad (28)$$

Then, the sum of the differences of $z_{k,n}$ is divided by the sum of the differences of channel hopping to obtain ToA, as shown by the equation:

$$\hat{D}_k = \frac{\alpha_k}{2\pi T_s} \times \frac{\sum_{n=1}^{N-1} |z_{k,n+1} - z_{k,n}|}{\Delta f \times \sum_{n=1}^{N-1} |f_k(n+1) - f_k(n)|} \qquad (29)$$

wherein the sign of ToA may be expressed by $$\alpha_k = \text{sign}\left(\frac{-\sum_{n=1}^{N-1}(z_{k,n+1} - z_{k,n})}{\sum_{n=1}^{N-1}(f_k(n+1) - f_k(n))}\right) = +1 \text{ or } -1 \qquad (30)$$

Hence, for each detected UE, the above joint RCFO/ToA synchronization algorithm is straight forward, easily implemented, and computationally efficient.

In conclusion, the present invention proposes an analysis method for multi-user random access signals, which can solve the linking problem between the base stations and the user equipment, and which can make the overall detection performance achieve a false alarm probability $P_F \leq 0.1\%$ and a detection probability $P_D > 99\%$, and which can accurately and efficiently detect each user equipment and estimate the synchronization parameters of ToA and RCFO to facilitate subsequent communications. Therefore, the present invention is a high-precision and low-computation burden analysis method with a definite threshold value.

The embodiments are described above to demonstrate the technical contents and characteristics of the present invention to enable the persons skilled in the art to understand, make, and use the present invention. However, these embodiments are only to exemplify the present invention but not to limit the scope of the present invention. Any equivalent modification or variation according to the spirit of the present invention is to be also included by the scope of the present invention.

What is claimed is:

1. An analysis method for multi-user random access signals, which applies to an uplink system of a narrowband Internet of thing (NB-IoT), and which comprises steps:
    receiving preamble signals of random access signals from a plurality of user equipment, detecting a plurality of symbol groups of each said preamble signal and acquiring corresponding average power, and comparing said average power with a detection threshold value to determine said user equipment intending to access signals; and
    acquiring a phase trace of said preamble signal corresponding to each of said user equipment intending to access signals, and calculating parameters of Time of Arrival (ToA) and Residual Carrier Frequency Offset (RCFO) according to phase differences of adjacent said symbol groups of said phase trace, wherein said detection threshold value is a Neyman Pearson threshold value, at least one base station collects bits generated by post-FFT (Fast Fourier Transform) of said symbol groups and detects sufficient statistics of said user equipment to determine said average power, and while said average power is greater than said detection threshold value, said user equipment corresponding to said average power intends to access said base station; while said average power is lower than said detection threshold value, said user equipment corresponding to said average power does not intend to access said base station.

2. The analysis method for multi-user random access signals according to claim 1, wherein said threshold value is determined using a false alarm level and a decision delay of said random access signals, in cooperation with a detected noise power; said decision delay is a count of all said symbol groups of said random access signal.

3. The analysis method for multi-user random access signals according to claim 1, wherein said preamble signals includes 4 symbol groups.

4. The analysis method for multi-user random access signals according to claim 3, wherein said step of calculating parameters of Time of Arrival (ToA) and Residual Carrier Frequency Offset (RCFO) according to said phase differences of adjacent said symbol groups of said phase trace further includes steps:
    calculating phase differences caused by channel hopping of said symbol groups;
    averaging all said phase differences corresponding to all said preamble signals to obtain said parameter of Residual Carrier Frequency Offset (RCFO);
    calculating average phase of each said symbol group to obtain an average phase difference corresponding to each said symbol group; and
    summing up said average phase differences to obtain said parameter of Time of Arrival (ToA).

* * * * *